June 28, 1932.  E. C. BALLMAN  1,865,160

ALTERNATING CURRENT MOTOR

Filed May 11, 1929

Inventor:
EDWIN C. BALLMAN,
By John N. Bruninga
His Attorney.

Patented June 28, 1932

1,865,160

UNITED STATES PATENT OFFICE

EDWIN C. BALLMAN, OF ST. LOUIS, MISSOURI

ALTERNATING CURRENT MOTOR

Application filed May 11, 1929. Serial No. 362,191.

This invention pertains to electric motors and more particularly to motors of the single phase condenser type.

The design of single phase condenser motors presents a difficulty in obtaining good performance both under starting and running conditions without resorting to a complicated assembly of starting devices. In such a motor the stator is usually equipped with a main winding and an auxiliary winding, which latter is usually wound with a phase displacement relatively to the former. The auxiliary winding is connected to a condenser. With such an arrangement, as the condenser voltage and capacity are adjusted so that the motor will give good performance under running conditions, it is impossible to obtain good starting performance without some adjustment.

One of the objects of this invention therefore is to provide a single phase condenser motor with equipment which may be manipulated so as to obtain good starting performance and also good full speed running performance.

Another object of this invention is to provide such a motor with condenser and transformer connections by means of which the rotor current may be controlled so as to give good performance under both running and starting conditions.

Another object is to provide such a motor with condenser and transformer connections such that all unnecessary transformer losses may be avoided.

Another object is to provide such a motor with transformer and condenser connections which may be changed from starting to running conditions by automatic switching devices.

Another object of this invention is to provide such a motor with speed controlling equipment such as to avoid all unnecessary transformer losses.

Further objects will appear from the following description taken in connection with the accompanying drawing, in which.

Figure 1:
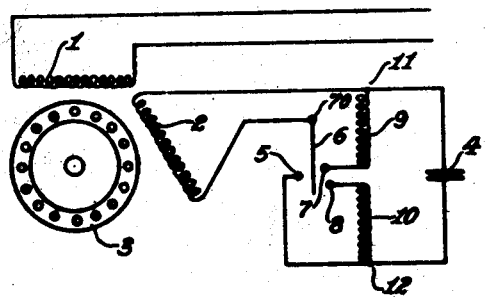
Figure 1 is a diagram showing the connections of a condenser motor embodying this invention.
Figure 2:
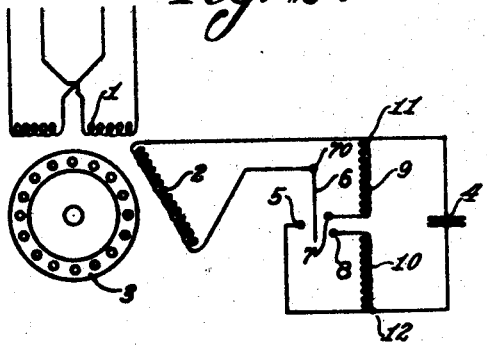
Figure 2 is a similar diagram showing the main winding of the stator provided with double voltage connections.

Referring now to the accompanying drawing 1 designates the main winding of a motor, 2 the auxiliary winding, and 3 the rotor of a single phase condenser motor. The windings 1 and 2 may be of any ordinary type usually used in single phase motors. The winding 2 is wound with its magnetic axis spaced from that of the main winding 1 usually by an angle of 60 electrical degrees. The rotor may be of the usual squirrel cage type. It has been found that better performance is obtained if the rotor 2 has a relatively high resistance.

A condenser 4, which may be of the static or electrolytic type has one of its terminals connected to one terminal of the winding 2 and its other terminal connected to a contact 5 of a switch having a swinging blade pivoted at 7. The blade 6 is arranged to make contact in one position with the contact 5 and in another position with two contacts 7 and 8.

An auto transformer having two coils 9 and 10 has its outer terminals 11 and 12 connected to the terminals of the condenser 4. The adjacent terminals of coils 9 and 10 are connected respectively to the contacts 7 and 8.

The winding 2 is so designed that the voltage induced therein during running operations is such as to impress upon the condenser 4 a current of such value that its reaction through the winding 2 upon the rotor 3 will produce a rotor current of proper phase and magnitude to give the desired running performance. The design of the winding 2 and of the condenser 4 may thus be adjusted to obtain the best proportion of each and so as to make the condenser 4 as small as practicable. When the switch blade 6 is moved into contact with the contacts 7 and 8 the transformer circuit is completed and the winding 2 is connected to the terminals of the coil 9. With this connection the transformer acts to step up the voltage of the winding 2 and to impress the increased voltage upon the condenser 4. The transformer may be so designed that this increased voltage impressed upon the condenser will cause a flow of current therein and a corresponding flow of current in the winding 2 such that its reaction upon the rotor 3 will produce the desired performance.

It will be seen therefore that by the arrangement of this invention both starting and running conditions may be accurately adjusted. Furthermore the switch blade 6 when thrown from starting to running position opens the transformer circuit so that during the continuous running of the motor all transformer losses are eliminated.

The switch 6 may be arranged so as to be operated automatically either by solenoid or controlled by the voltage induced in the winding 2 or other sources, or may be centrifugally controlled by the speed of the motor. In this way the entire operation of the motor may be made automatic.

Figure 3:
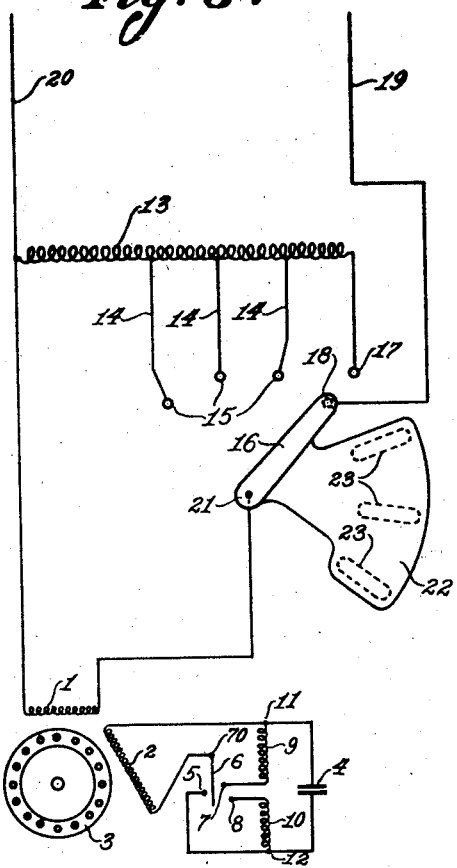
Figure 3 is a diagram illustrating the application of a speed controlling transformer to the motor in accordance with this invention.
Figure 4:
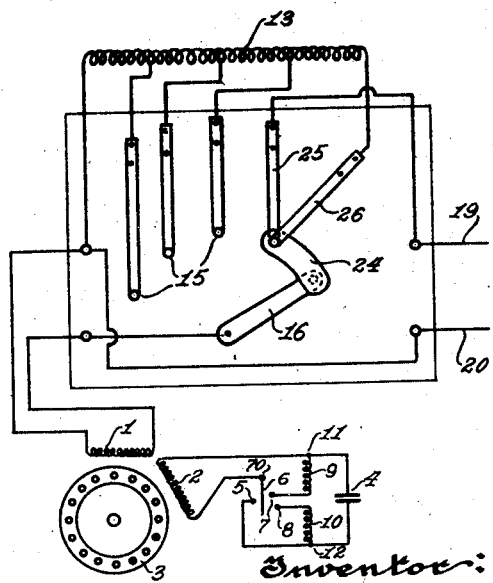
Figure 4 is a similar diagram showing a modified form of controlling switch.

Referring to Figures 3 and 4 a transformer 13 may be provided to vary the running speed of the motor. This may be of the auto-transformer type as illustrated and provided with taps from which voltages of any value may be obtained. In accordance with this invention the switching device is so arranged that the circuit of the transformer 13 will be opened when the motor is running at full speed.

The taps 14 may be connected to switch contacts 15 of a switch having a movable arm 16 adapted to be moved into contact with any of the contacts 15. The end terminal of the transformer 13 is connected to a contact 17 which is radially aligned with a contact 18. The contact 18 is on the same circle with the contacts 15 and represents the full speed position of the arm 16. One terminal 19 of the supply line is connected to the contact 18 while the other terminal 20 is connected to the other end of the transformer 13 and to one of the motor terminals. The central point 21 of the switch arm 16 is connected to the other motor terminal.

The arm 16 has mounted thereon an insulating sector 22 having secured to the underside thereof a series of radially disposed contacts 23. The contacts 23 are spaced angularly to correspond with the spacing of the contacts 15.

With the switch arm in the position shown in Figure 3 the full line voltage is impressed upon the motor so as to cause it to run at full speed. Under these conditions the circuit to the transformer 13 is opened so as to avoid transformer losses. As the switch arm 16 is swung to the left, Figure 3, it makes contact successively with the contacts 15. At the same time one or another of the contacts 23 will establish a circuit between the contacts 17 and 18. This connects the end terminal of the transformer 13 to the terminal 19 of the supply line. Thus the transformer circuit is closed, and a reduced voltage may be taken from one of the contacts 15 to be impressed upon the motor.

In the arrangement shown in Figure 4 the transformer 13 is connected to contacts 15 of a switch as described for Figure 3. The arm 16, however, is equipped with an insulating sector 24. In the off position of the switch as illustrated in Figure 4 the sector 24 stands between a contact 25 connected with the terminal 19 of the supply line and a spring contact 26 connected to the end terminal of the transformer 13. This breaks the circuit to the transformer so as to avoid the losses therein.

As the arm 16 is swung to the left Figure 4, it makes contact with the contact 25 while the spring contact 26 still rests upon the insulating sector 24. This connects the motor terminals directly to the supply line with the transformer circuit open. As the switch arm moves onward to the contacts 15 the spring contact 26 is released so as to engage the contact 25 thereby closing the transformer circuit. The sector 24 is so arranged that upon return movement it will pick up the spring contact 26 and again open the transformer circuit.

It would be seen that this invention provides means for operating and controlling a single phase condenser motor in such a way as to avoid all unnecessary losses and to obtain the best possible performance under both starting and running conditions. The design of the winding 2 the transformers 9 and 10 and the condenser 4 may be so adjusted relatively to one another as to give the best possible starting and running performance and the switch 6 provides not only for changing from starting to running connections but also for opening the transformer circuit so as to cut out transformer losses.

The switching devices illustrated in Figures 3 and 4 provide for speed regulations of the motor for any desired range of speed. At the same time the transformer circuit is open at full speed so that continued operation under that condition will not be accompanied by losses in the transformer.

While this invention has been described as a unitary device, it will be understood that certain features and operations may be useful without reference to other features or to the complete combination. It is understood therefore that the employment of such sub-combinations or operations is contemplated by this invention and is within the scope of appended claims.

It is further obvious that various changes may be made in the details of construction or operation, within the scope of appended claims without departing from the spirit of this invention; it is understood therefore that this invention is not limited to the specific details shown and/or described.

Having thus described the invention, what is claimed is:

1. A single phase, alternating current, induction motor having main and auxiliary windings wound on angularly spaced magnetic axes, in combination with a condenser, a transformer, and a switch, said switch being connected directly to said auxiliary winding, said condenser and said transformer and operable to establish circuits from said condenser to said winding excluding said transformer in one position, and including said transformer in another position.

2. A single phase, alternating current, induction motor having main and auxiliary windings wound on angularly spaced magnetic axes, in combination with a condenser, a transformer, and a switch, said switch being connected to said auxiliary winding, said condenser and said transformer and operable to establish a circuit from said condenser to said winding in one position, and from said condenser to said transformer and said transformer to said winding in another position, said transformer circuit being open in said first position.

3. A single phase, alternating current, induction motor having main and auxiliary windings wound on angularly spaced magnetic axes, in combination with a condenser, a transformer, and a switch, said switch being connected to said auxiliary winding, said condenser and said transformer and operable to establish a circuit from said condenser to said winding in one position, and from said condenser to said transformer and said transformer to said winding in another position, said transformer circuit being open at an intermediate point in said first position.

4. A single phase, alternating current, induction motor having main and auxiliary windings wound on angularly spaced magnetic axes, in combination with a condenser, a transformer, and a switch, said switch being connected to said auxiliary winding, said condenser and said transformer and operable to establish a circuit from said condenser to said winding in one position, the transformer circuit being open, and in another position from said winding to said transformer and from said transformer to said condenser so as to step up the voltage of said winding and impress the increased voltage on said condenser.

5. A single phase, alternating current, induction motor having main and auxiliary windings wound on angularly spaced magnetic axes, in combination with a condenser, a transformer, and a switch, said switch being connected to said auxiliary winding, said condenser and said transformer and operable to establish a circuit from said condenser to said winding in one position, the transformer circuit being open at an intermediate point of the transformer winding, and in another position from said winding to said transformer and from said transformer to said condenser so as to step up the voltage of said condenser so as to step up the voltage of said winding and impress the increased voltage on said condenser.

6. A single phase, alternating current, induction motor having main and auxiliary windings wound on angularly spaced magnetic axes, in combination with a condenser, a transformer, and a switch, said transformer being connected at its outer terminals to said condenser and having a gap at an intermediate point in its winding, and said switch being constructed and arranged so as, in one position, to connect said auxiliary winding to said transformer at said gap, closing said gap, and in another position to open said gap and connect said auxiliary winding to said condenser.

In testimony whereof I affix my signature this 7th day of May, 1929.

EDWIN C. BALLMAN.